April 2, 1940.  F. C. SMISCHNY  2,195,635
WHEEL MANIPULATING TOOL
Filed Aug. 18, 1939
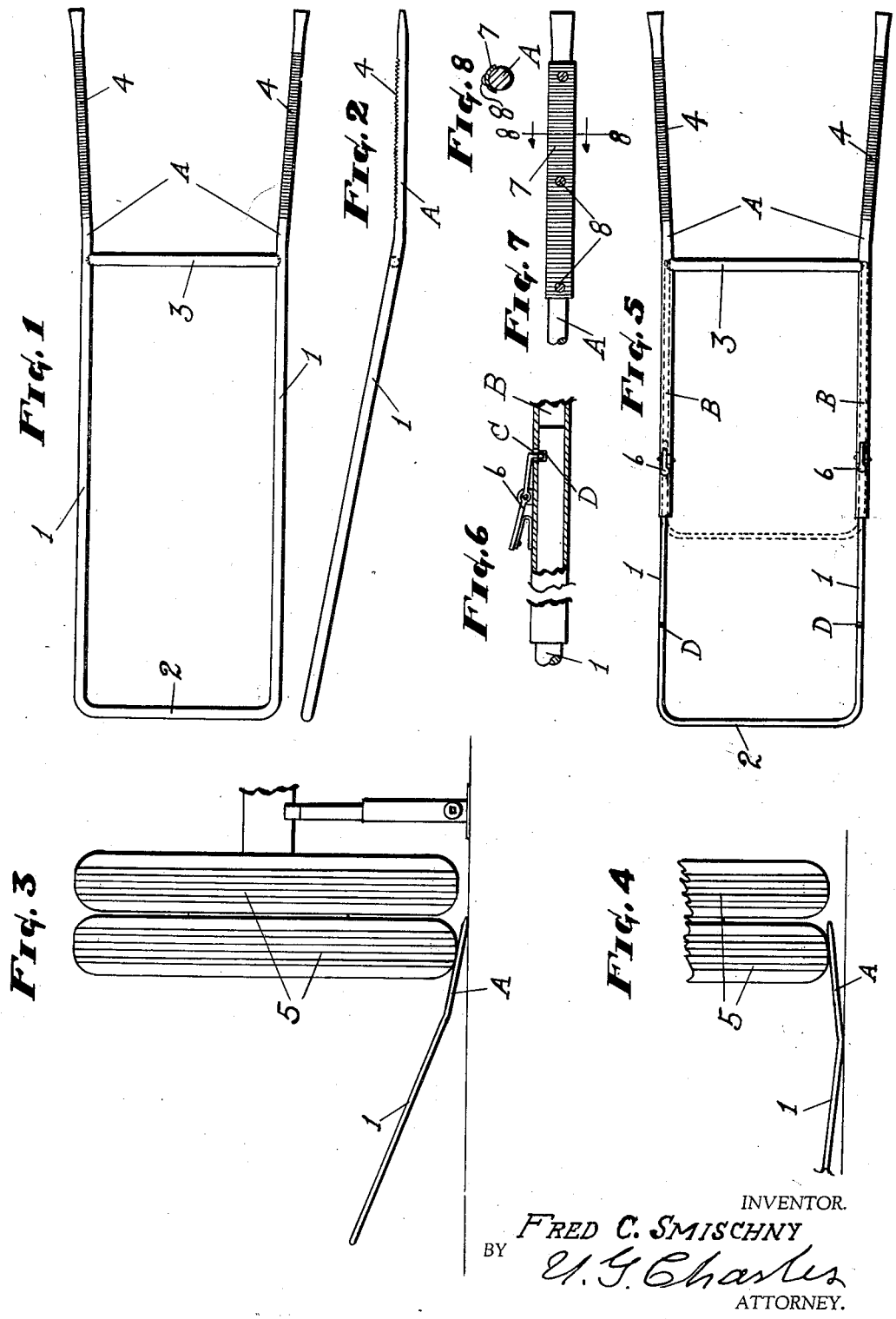
INVENTOR.
FRED C. SMISCHNY
BY
ATTORNEY.

Patented Apr. 2, 1940

2,195,635

UNITED STATES PATENT OFFICE 2,195,635

WHEEL MANIPULATING TOOL

Fred C. Smischny, Wichita, Kans.

Application August 18, 1939, Serial No. 290,806

2 Claims. (Cl. 254—131)

My invention relates to a wheel manipulating tool and has for its principal object to support a pneumatic tire mounted wheel of great weight at the time of removing and replacing the same.

A further object of my invention is to produce a tool of such construction as to receive and retain the tire of a wheel in a fixed position on the tool to simplify the task of such installation and removal of tire mounted wheels from a bus, truck, or the like.

A still further object of my invention is to provide a tool for the purpose herein set forth that is inexpensive to manufacture, compact, and conveniently carried by the vehicle.

A still further object of my invention is to provide a tool that will function in the capacity of a pinch bar to accurately position the wheel upon the hub of an axle preparatory to securing the same thereto.

These and other objects will hereinafter be more fully described, reference being had to the accompanying drawing forming a part of this specification, in which like characters will apply to like parts in the different views.

Referring to the drawing:

Fig. 1 is a plan view of the tool.

Fig. 2 is a side view of Fig. 1.

Fig. 3 is a side view of the tool in one operative position with respect to the tires of the wheel.

Fig. 4 is a similar view showing the tool in a different operative position from that shown in Fig. 3.

Fig. 5 is an alternate plan view of the tool, illustrating collapsation thereof.

Fig. 6 is an enlarged sectional view illustrating the pawl for a fixed position of the handle portion of the tool.

Fig. 7 is a modification for the abrasive portion of the prongs.

Fig. 8 is a sectional view taken on line 8—8 in Fig. 7.

My invention herein disclosed consists of a steel rod or the like, bent U-shape in form to provide a pair of legs 1 spaced apart and being integrally joined at one end by a portion of the rod transversely extending from one leg to the other, whereby a handle 2 is formed, the other ends being secured together by a cross bar 3 spaced inward from said ends whereby outward extending prongs A are provided, the ends of which are flattened for broad engagement to slide more freely with a load imposed thereon. The prong portions each extend slantingly in the same direction from the axis of the legs and diverging toward their outer ends by bending the same at or near the point where the said securing bar joins the legs, said points being the heel or fulcrum point of the tool to rock the free ends of the prongs upward by downward movement of the handle as shown in Fig. 4, while the toe or outer ends of said prongs will function as a bearing to raise the load imposed on the prongs, and each prong along its upper side has a series of closely positioned protrusions 4 to function as abrasions, whereby the tread of a tire 5 is retained firmly thereon while the tool is moved by an operator. Such movement may be longitudinal of the tool or walking by alternate engagements at the pry or fulcrum points, respectively, as the case may require.

It will now be seen that a tool constructed as herein set forth is a simple and efficient means whereby single or dual tires of maximum size and weight may be removed and replaced by a single operator which has been my experience in such work and when the wheel is removed it is easily conveyed by the tool from the vehicle, and likewise advanced theretoward as the prong portions are adapted to rest substantially their entire length on a floor, road-bed or the like, however the arc of the tire may be sufficient to strike below the underside of the prongs, in which case, by elevating the handle, the tire will clear the floor and the load will be imposed on the flat end portion of the prongs heretofore described. Said prongs being spaced apart is means to avoid a rolling tendency of the wheel during movement of the tool, and the abrasive feature on each prong is also to avoid twisting movement of the wheel and a positive means to move the wheel to its point of engagement for final attachment.

Inasmuch as a tool of the character described is subject to being employed at any time during transit of the vehicle, such tool should be available by placing the same therein by the discretion of the manufacturer or operator, and the tool may be reduced in length which is accomplished by telescopic engagement of the legs as shown in Fig. 5. Being so arranged a pawl 6 is carried by the sleeves B of the legs while the teeth C thereof will engage in notches D, the ends of each of which are at right angles to their respective leg portions, the notches being at the extreme outward and inward movement of the telescopic arrangement to firmly secure the same at a predetermined position.

A further modification is the provision of an abrasive element 7, there being one secured to each prong by screws 8 by which means the abrasions are easily arranged by rolling the structure in the course of manufacture, whereby a segment of a pipe is formed to fit snugly on the body of the prongs, and such other modifications may be made as lie within the scope of the appended claims.

Having fully described my invention what I claim as new and desire to secure by Letters Patent is:

1. In a wheel manipulating tool, a tool of the class described comprised of a U-shaped portion formed of a single rod by bending the same at right angle from each end of a medially positioned straight portion, the straight portion functioning as a handle for the other portions that extend therefrom in parallelism for a major portion of their length while the minor portions each have a bend laterally in the same direction to form a fulcrum point to raise and carry a wheel of a motor-driven vehicle seated thereon at the time of removing and replacing the wheel, and the said minor portions having another bend divergently, the outer ends of which are flattened to slideably engage when moving the wheel or assist alternately in walking movement of the tool toward and from its spindle of the wheel and the said flattened portion as a convenience to force the same beneath the thread of the wheel, a bar transversely positioned and connecting the major parallel portions adjacent the bend, each minor portion having a series of protrusions formed therealong to engage with the thread of a tire to avoid longitudinal movement of the minor portions from the tire as the tool is moved longitudinally of its structure.

2. In a wheel manipulating tool, a tool of the class described comprised of a U-shaped portion formed of a single rod by bending the same at right angle from each end of a medially positioned straight portion, the straight portion functioning as a handle for the other portions that extend therefrom in parallelism for a major portion of their length while the minor portions each have a bend laterally in the same direction to form a fulcrum point to raise and carry a wheel of a motor-driven vehicle seated thereon at the time of removing and replacing the wheel, and the said minor portions having another bend divergently, the outer ends of which are flattened to slideably engage when moving the wheel or assist alternately in walking movement of the tool toward and from its spindle of the vehicle, and the said flattened portion as a convenience to force the same beneath the thread of the wheel, a bar transversely positioned and connecting the major parallel portions adjacent the bend, an element of appreciable width and length having abrasions therealong and means to rigidly secure the element to each of said minor portions and being positioned to confront upward and toward each other, the abrasions to engage with the thread of a tire to avoid longitudinal movement of the minor portions from the tire as a tool in moved longitudinally of its structure.

FRED C. SMISCHNY.